United States Patent
Guarneri et al.

(10) Patent No.: US 11,887,584 B2
(45) Date of Patent: Jan. 30, 2024

(54) VOCAL COMMAND RECOGNITION

(71) Applicant: STMicroelectronics S.r.l., Agrate Brianza (IT)

(72) Inventors: Nunziata Ivana Guarneri, Caltanissetta (IT); Viviana D'Alto, Cassina de' Pecchi (IT)

(73) Assignee: STMicroelectronics S.r.l., Agrate Brianza (IT)

(*) Notice: Subject to any disclaimer, the term of this patent is extended or adjusted under 35 U.S.C. 154(b) by 225 days.

(21) Appl. No.: 17/351,870

(22) Filed: Jun. 18, 2021

(65) Prior Publication Data

US 2022/0406298 A1   Dec. 22, 2022

(51) Int. Cl.
| | |
|---|---|
| *G10L 15/16* | (2006.01) |
| *G10L 15/22* | (2006.01) |
| *G10L 25/24* | (2013.01) |
| *G10L 15/02* | (2006.01) |
| *G10L 15/06* | (2013.01) |
| *G10L 25/21* | (2013.01) |

(Continued)

(52) U.S. Cl.
CPC .............. *G10L 15/16* (2013.01); *G06N 3/045* (2023.01); *G10L 15/02* (2013.01); *G10L 15/063* (2013.01); *G10L 15/22* (2013.01); *G10L 25/21* (2013.01); *G10L 25/24* (2013.01); *G10L 2015/027* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,852,731 B2 | 12/2017 | Dadu et al. | |
| 11,205,420 B1* | 12/2021 | Fu | G06N 3/04 |
| 11,348,579 B1* | 5/2022 | Strand | H04M 3/42263 |

(Continued)

FOREIGN PATENT DOCUMENTS

| | | |
|---|---|---|
| KR | 102228017 B1 | 3/2021 |
| WO | 2020123200 A2 | 6/2020 |

OTHER PUBLICATIONS

Yan, Haikang, Qianhua He, and Wei Xie. "CRNN-CTC based mandarin keywords spotting." ICASSP 2020—2020 IEEE International Conference on Acoustics, Speech and Signal Processing (ICASSP). IEEE, 2020. (Year: 2020).*

(Continued)

*Primary Examiner* — Douglas Godbold
(74) *Attorney, Agent, or Firm* — Slater Matsil, LLP

(57) ABSTRACT

A method to detect a vocal command, the method including: analyzing audio data received from a transducer configured to convert audio into an electric signal and analyzing the data using a first neural network. The method also includes detecting a keyword from the audio data using the first neural network on the edge device, the first neural network being trained to recognize the keyword. The method further includes activating a second neural network after the keyword is identified by the first neural network and analyzing the audio data using the second neural network, the second neural network being trained to recognize a set of vocal commands. The method to detect a vocal command may also include detecting the vocal command word using the second neural network.

20 Claims, 11 Drawing Sheets

(51) Int. Cl.
*G06N 3/045* (2023.01)
*G10L 15/08* (2006.01)

(56) References Cited

U.S. PATENT DOCUMENTS

| | | | | |
|---|---|---|---|---|
| 11,355,102 | B1* | 6/2022 | Mishchenko | G10L 15/063 |
| 11,521,599 | B1* | 12/2022 | Jose | G10L 15/05 |
| 11,579,841 | B1* | 2/2023 | Eich | G06F 3/167 |
| 11,580,955 | B1* | 2/2023 | Meng | G10L 15/063 |
| 11,605,376 | B1* | 3/2023 | Hoover | G10L 15/183 |
| 11,605,387 | B1* | 3/2023 | Muralitharan | G10L 15/1815 |
| 2018/0330723 | A1* | 11/2018 | Acero | G10L 25/78 |
| 2021/0055778 | A1* | 2/2021 | Myer | G06N 3/045 |
| 2021/0065688 | A1 | 3/2021 | Guarneri et al. | |
| 2021/0065689 | A1* | 3/2021 | Guarneri | G10L 15/22 |
| 2021/0082397 | A1* | 3/2021 | Kennewick | G06F 3/167 |
| 2021/0192332 | A1* | 6/2021 | Gangotri | G06N 3/045 |
| 2022/0238118 | A1* | 7/2022 | Mazzoccoli | G10L 17/18 |
| 2023/0068798 | A1* | 3/2023 | Etchart | G06V 40/165 |

OTHER PUBLICATIONS

Shahnawaz, M. et al., "Studying the Effects of Feature Extraction Settings on the Accuracy and Memory Requirements of Neural Networks for Keyword Spotting," 2018 IEEE 8th International Conference on Consumer Electronics—Berlin (ICCE—Berlin), Sep. 2018, 6 pages, Catania, Italy.

Zhang, Y. et al., "Hello Edge: Keyword Spotting on Microcontrollers," Stanford University, Feb. 14, 2018, pp. 1-14, Stanford, CA.

* cited by examiner

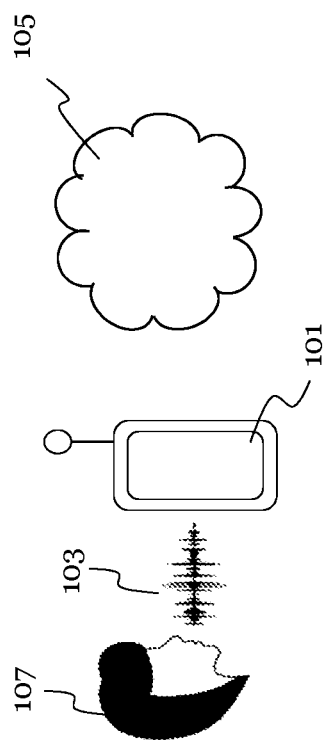
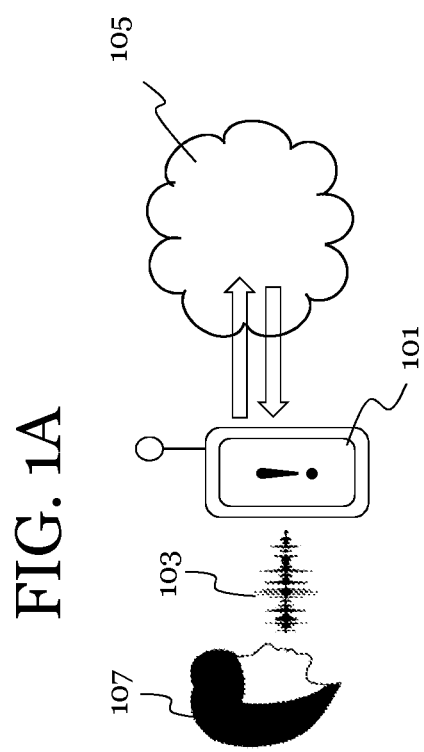
FIG. 1A
FIG. 1B

VOCAL COMMAND RECOGNITION

TECHNICAL FIELD

The present invention relates generally to devices and methods to recognize vocal commands.

BACKGROUND

Generally, a Voice User Interface (VUI) enables users to interact with a device or application by using voice commands. Users may control a device with a VUI without looking at it or using their hands. Known systems for VUIs may utilize listening devices that communicate with a cloud network. The listening device may receive audio data containing speech and perform a Keyword Spotting (KWS) operation to find a keyword in a frame of audio data. If a keyword is detected, the listening device may connect to a cloud network to perform Automatic Speech Recognition (ASR) on the audio data to detect commands. ASR requires fast processing, large memory resources, and complex operations. By connecting to a cloud, the listening device may outsource this process and take advantage of the cloud's resources to perform ASR. But, latency, privacy, and other considerations may make it desirable to have devices that autonomously recognize vocal commands without cloud assistance.

SUMMARY

In accordance with an embodiment, a method to detect a vocal command word includes analyzing audio data using a first neural network on an edge device; detecting a keyword from the audio data using the first neural network, the first neural network having a first processing workload; activating a second neural network on the edge device after the keyword is identified by the first neural network, the second neural network having a second processing workload that is greater than the first processing workload; analyzing the audio data using the second neural network; and detecting the vocal command word using the second neural network.

In accordance with an embodiment, an electronic device includes a processing circuitry configured to analyze audio data using a first neural network run on the processing circuitry, the first neural network having a first processing workload detect a keyword from the audio data using the first neural network; activate a second neural network on the processing circuitry after the keyword is identified by the first neural network, the second neural network having a second processing workload that is greater than the first processing workload; analyze the audio data using the second neural network; and detect a vocal command word using the second neural network.

In accordance with an embodiment, a non-transitory computer-readable storage medium storing a computer program for execution by a processing circuit, the computer program comprising software code portion to cause the processing circuit to implement a method including: analyzing audio data using a first neural network on an edge device, the first neural network having a first processing workload; detecting a keyword from the audio data using the first neural network; activating a second neural network on the edge device after the keyword is identified by the first neural network, the second neural network having a second processing workload that is greater than the first processing workload; analyzing the audio data using the second neural network; and detecting a vocal command word using the second neural network.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A depicts a cloud-connected device using Voice User Interface performing Keyword Spotting;

FIG. 1B depicts a cloud-connected device using Voice User Interface communicating with a cloud performing Automatic Speech Recognition;

DETAILED DESCRIPTION OF ILLUSTRATIVE EMBODIMENTS

Figure 2:
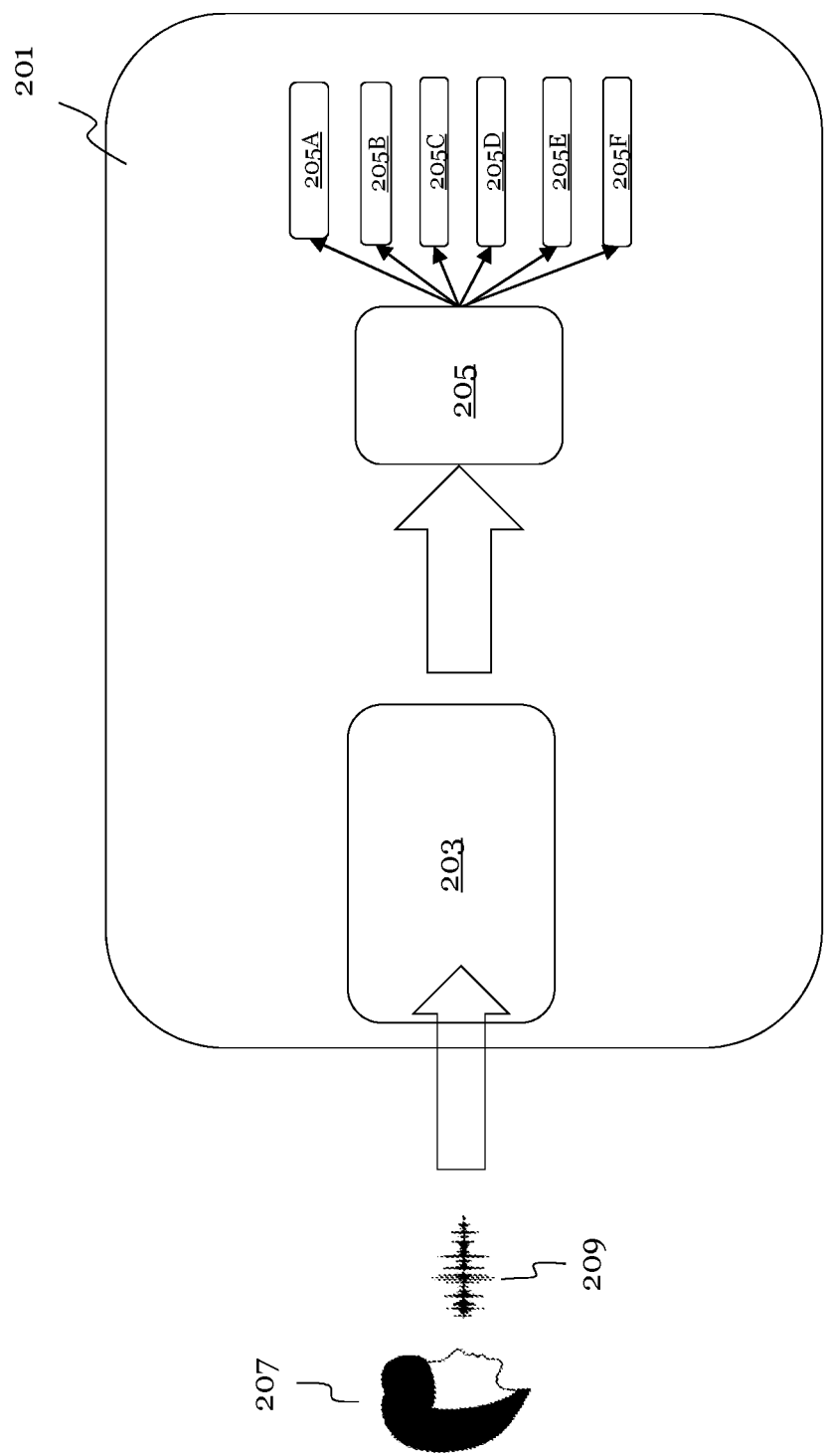
FIG. 2 depicts an autonomous vocal-command recognition device in accordance with an embodiment.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

FIG. 1A depicts a cloud-connected device using Voice User Interface performing Keyword Spotting.

A listening device 101 with a VUI receives audio data 103 from its surroundings. The listening device 101 analyzes the audio data 103 searching for a key word by KWS. This process is done on the listening device 101 without involvement from a cloud 105. However, KWS recognition is typically limited to one vocal word or small phrase. For example, a KWS operation may only recognize the word "Marvin." After a user 107 vocalizes the keyword, the listening device may initiate an information exchange with a cloud 105 to recognize commands from audio data.

FIG. 1B depicts a cloud-connected device using Voice User Interface communicating with a cloud performing Automatic Speech Recognition;

Keyword detection by the listening device 101 will trigger communication with a cloud 105. The audio data 103 may be transmitted to the cloud 105 where ASR may be performed. The listening device 101 does not have the processing and memory resources to perform ASR. So, it has to wait for the cloud 105 to receive data from the listening device. The listening device 101 also has to wait while the cloud performs ASR, and determine whether any commands have been spoken by a user 107. Finally, the listening device 101 has to wait to receive processed data back from the cloud 105.

Cloud 105 involvement, thus, slows down the listening device's 101 response time. And, the listening device (or any other device waiting on instructions) cannot begin to perform any commanded operation until after processed data is transmitted from the cloud 105. In various applications, this lag time may mean the difference between successful operation and a failed operation and can adversely impact user experience.

Involving the cloud 105 may also introduce privacy and security concerns. Data can be intercepted and cloud networks may be hacked. Audio data can be stolen and commands from a compromised cloud may deviate from the user's intended commands. Further cloud involvement may result in excess energy consumption that is costly and adversely impacts the environment.

The drawbacks may be avoided by performing data analysis on the listening device without involving a cloud. This can reduce the latency, cut energy expense, and provide more secure command recognition and response. However, challenges exist to perform command recognition using devices with limited power, processing, and memory resources.

FIG. 2 depicts an autonomous vocal-command recognition device in accordance with an embodiment.

To conserver power, processing and other resources on the autonomous vocal-command recognition device 201 vocal-command recognition may be segmented into parts. Command recognition with an autonomous device introduces power consumption constraints that are not of concern when outsourcing the function to a cloud. In various embodiments, an autonomous command recognition device includes a Neural Network pipeline. A first less burdensome, fast and robust neural network may operate continuously to perform KWS. Once a keyword is spotted by the first neural network, a second, more complex neural network may be triggered to detect a set of command words. Both the first neural network and the second neural network will work to perform their respective functions without involvement of a cloud. The autonomous vocal-command recognition device 201 may comprise an edge device.

The autonomous vocal-command recognition device 201 may comprise a first neural network 203 and a second neural network 205. While operating, the autonomous vocal-command recognition device 201 may receive audio data 209. The audio data 209 may comprise audio collected from the environment surrounding the autonomous vocal-command recognition device 201. The audio data 209 may include speech vocalized by a user 207. The audio data 209 may also represent a stream of data collected from a surrounding environment. Audio data collection may occur continuously.

The audio data 209 may be directed to the first neural network 203. As will be appreciated, the audio data 209 may undergo processing before being received in a processed form by the first neural network 203. The first neural network 203 may be always-on to search for a keyword in the audio data. It may continually perform KWS to identify a keyword, for example "Marvin."

Identification of the keyword by the first neural network 203 may trigger operation of the second neural network 205. The second neural network may receive audio data 209. Again, the audio data 209 may be processed before received by the second neural network 205. The second neural network 205 may be trained to detect a set of command words from the audio data 209.

The complexity, and thus the resource burden, of the first neural network 203 may be minimized because the first neural network may be limited to search for a single keyword or phrase. As a result, energy, processing, and memory demands may be reduced while the first neural network 203 is working but not the second neural network 205. Power consumption and the processing workload of the he autonomous vocal-command recognition device 201 may be improved with such an internal neural network pipeline.

The second neural network 205 may be more complex than the first neural network 203. This may allow the second neural network to identify a set of command words. The number of command words identified by the second neural network 205 may be different in various embodiments. As the number of command words increases, the complexity of the network may also increase. In combination, the first neural network 203 and the second neural network 205 may complement each other to reduce energy and maximize processing and memory resources to identify a set of command words without involving a cloud network. The first neural network may impose a lower processing workload on the processing resources of the autonomous vocal-command recognition device 201 than the second neural network. By using the first neural network in a pipeline with the second neural network, the overall workload of the system may be reduced by avoiding continuous operation of a bigger and more complex neural network. The processing workload may comprise the number of computations needed to produce output results for a single inference.

In various embodiments, the second neural network 205 may identify, from the audio data 209, a first command word 205A, a second command word 205B, a third command word 205C, a fourth command word 205D, a fifth command word 205E, and a sixth command word 205F. Each of command words may trigger performance of a separate task. For example, the command words may be delivered to other internal applications or communicated to other devices that interpret the data.

By way of example, in various embodiments, the keyword may comprise the word "Marvin." The first command word 205A may comprise the word "go." This command word may trigger the autonomous vocal-command recognition device 201, or a device in communication with the autonomous vocal-command recognition device 201, to begin to move. The second command word 205B may comprise the word "stop." This command word may trigger the autonomous vocal-command recognition device 201, or a device in communication with the autonomous vocal-command recognition device 201, to stop moving. The third command word 205C may comprise the word "left." This command word may trigger the autonomous vocal-command recognition device 201, or a device in communication with the autonomous vocal-command recognition device 201, to turn to the left. The fourth command word 205D may comprise the word "right." This command word may trigger the autonomous vocal-command recognition device 201, or a device in communication with the autonomous vocal-command recognition device 201, to begin to turn to the right. The fifth command word 205E may comprise the word "up." This command word may trigger the autonomous vocal-command recognition device 201, or a device in communication with the autonomous vocal-command recognition device 201, to begin to tilt upwards. And, the sixth command word 205F may correspond to filler, which is anything other than the first five command words, and may not cause any change.

Continuing with the example in the previous paragraph, a user may vocalize a command "Marvin, go." The first neural network 203, which continuously operates, may detect the keyword "Marvin." This may trigger the second neural network 205 to analyze the audio data 209. The second neural network 205 may detect the word "go" and communicate a corresponding command. A user may similarly instruct the autonomous vocal-command recognition device 201 do communicate commands to stop, turn left, turn right, or tilt up vocally by speaking the corresponding command.

Audio data 209 may need to be processed before it is received by the first neural network 203 and the second neural network 205. In various embodiments, such processing may include dividing audio data 209 into frames extracting a Mel Frequency Cepstral Coefficients (MFCC) from the frames. MFCC extraction may be performed, in various embodiments, as disclosed in U.S. patent application Ser. No. 16/708,983 filed on Dec. 10, 2010 and entitled "Trigger to Keyword Spotting System (kws)," which is incorporated by reference in its entirety herein.

Figure 3:
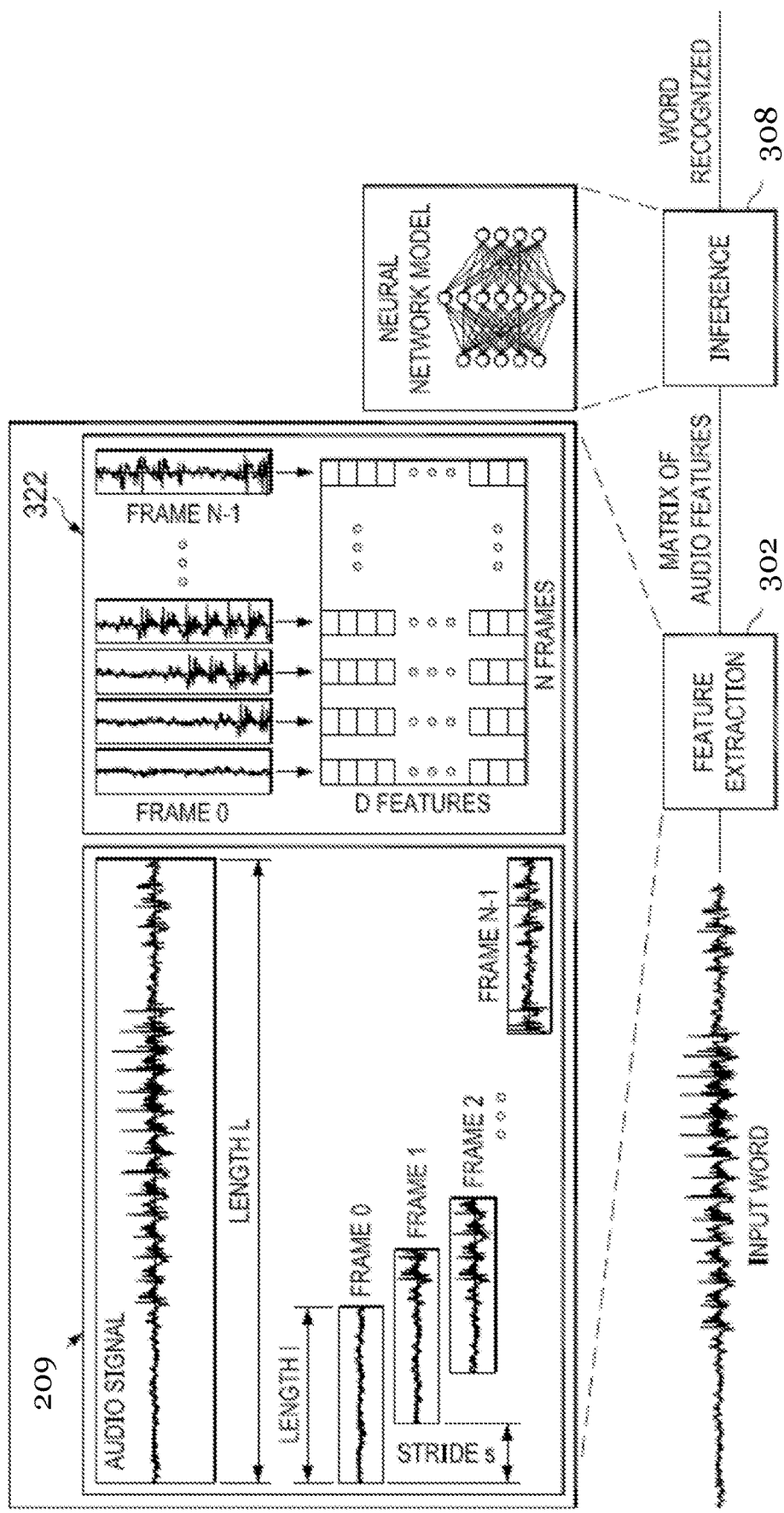
FIG. 3 shows a conventional technique of framing used to extract audio features from audio data.

FIG. 3 shows a conventional technique of framing used to extract audio features from audio data.

A feature extraction module 302 segments an audio data 209 into a plurality of N audio frames (labelled as frames 0, 1, 2, . . . , and N−1). An audio frame may have an overlapping portion with its immediate succeeding audio frame. The non-overlapping portion of the audio frame is called a stride. From the N audio frames, the feature extraction module 302 generates a D×N Mel Frequency Cepstral Coefficients (MFCC) matrix 322. Each element in the MFCC matrix is a coefficient representing an audio feature. A different column of the MFCC matrix corresponds to a different audio frame. A different row of the MFCC matrix representing a different type of audio features. For example, the first row of the MFCC matrix includes coefficients representing the power features of the audio frames. So, the first element of the first column of the MFCC matrix (MFCC[0][0]) is a coefficient representing the power feature of the first audio frame (frame 0). Techniques for generating an MFCC matrix from the audio frames are known in the art. The extracted features (i.e., the MFCC matrix) are the input to the neural network model of the inference unit 308, which may comprise a neural network such as the first neural network 203 or the second neural network. The inference unit 308 outputs the word recognized.

As will be appreciated by one of ordinary skill in the art, a first neural network 203 may need to be trained to identify a specific keyword. By way of example, in various embodiments, the first neural network may be trained to produce three outputs. A first output may used to identify a first syllable of a keyword. A second output may be used to identify a second syllable of a keyword, and a third output may be used to determine whether the data comprises filler.

Figure 4:
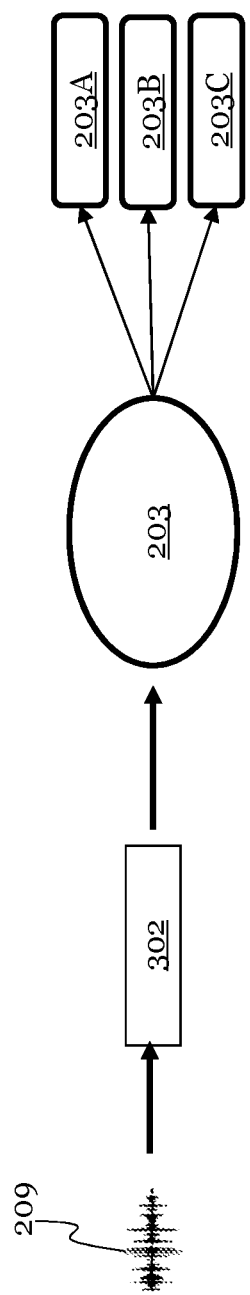
FIG. 4. depicts a block diagram representing output of a first neural network in accordance with an embodiment.

FIG. 4. depicts a block diagram representing output of a first neural network in accordance with an embodiment.

Audio data 209 may be received by feature extraction module 302. The feature extraction module 302 may extract an MFCC matrix that is provided the first neural network 203. As discussed above, the first neural network 203 may be trained to identify a first syllable of a keyword and a second syllable of the keyword. For example, a first output 203A of the first neural network 203 may correspond to the syllable "mar" of the word "Marvin." A second output 203B may correspond to the syllable "vin" the word "Marvin." For each frame of audio data the first neural network 203 may produce outputs corresponding to the probability that the respective syllables are present in the audio frame. This may be referred to as an inference. In various embodiments, using an 80 MHz processor and 32 node, 1 layer LTSM neural network followed by a Multi Layer Perceptron, for a 32 ms frame-stride of audio data it may take 15 ms for the first neural network 203 to produce an inference and 9 ms for a new MFCC column to be extracted by the feature extraction module 302. So it may take 24 ms in total to generate an inference about for the keyword in a frame of audio data.

The first neural network 203 may be trained so that it searches a first part of an audio frame for the syllable "mar" and a second part of an audio frame to detect the syllable "vin." The first neural network 203 may also be trained to detect filler at a third output 203C, which may be anything other than the other sounds the first neural network 203 has been trained to identify. The first output 203A of the first neural network 203 may be trained with a data set corresponding to the sound "mar," the second output 203B of the first neural network 203 may be trained with a data set corresponding to the sound "vin", and the third output 203C of the first neural network 203 may be trained with a data set corresponding to filler sounds.

Training the first neural network 203 may comprise supervised training using a data set of identified audio samples, for example, data sets that are identified as containing "mar," "vin," or filler. The first neural network 203 of autonomous vocal-command recognition device 201 may output a probability that an audio sample includes a first sound at first output 203A, a second sound at the second output 203B and a third sound at the third output 203C of the first neural network 203. These probabilities are determined based on the inputs to the neural network and weighting relationships between internal nodes of the neural network. During training, these probabilities are fed back to the autonomous vocal-command recognition device 201 which adjusts the internal weighting of the first neural network 203 depending on the accuracy of the outputs in view of the identified audio samples. This training process may continue until first neural network 203 is able to satisfactorily identify the desired sounds In various embodiments, a confidence score may be calculated based on the outputs of the first neural network 203. For example, a confidence score may be calculated based on the probability that the syllable "mar" has been identified, that the syllable "vin" has been identified, and the probability that the audio data is not filler. For example, if the probability that the syllable "mar" has been identified at the first output 203A is high, the probability that the output "vin" is also high, and the probability that the audio data comprises filler is low, a high confidence score may be calculated. Probabilities output by the first neural network may be compared with thresholds to determine whether the probability is considered to be high or low. In various embodiments, the confidence score may simply comprise a pass or fail scheme where a pass indicates that the audio data meets a minimum threshold to conclude that a keyword has been uttered. In various embodiments, the first network 203 may comprise a Recurrent Neural Network such as a Long Short-Term Memory Recurrent Neural Network. In various embodiments, the first neural network 203 may comprise 32 node, 1 layer LTSM network followed by a Multilayer Perceptron. It should be appreciated that other types of neural networks may be used in various embodiments, including but not limited to simple Recurrent Neural Networks, Convolutional Neural Network, and Multilayer Perceptron networks. The configuration of the networks in terms of the number nodes, layers and other factors may differ in various embodiments. As will be appreciated, a confidence score may be calculated in a variety of ways known in the art.

Figure 5:
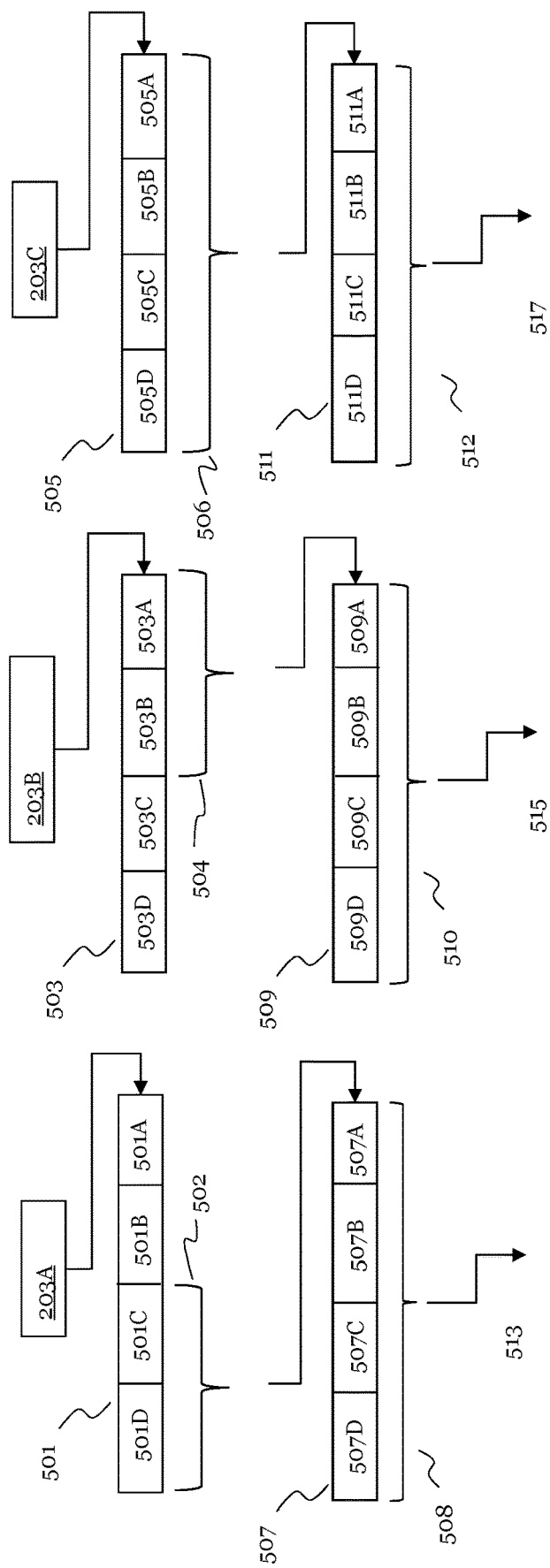
FIG. 5 depicts confidence score buffers in accordance with an embodiment.

FIG. 5 depicts confidence score buffers in accordance with an embodiment.

In various embodiments, the autonomous vocal-command recognition device 201 may comprise a first predictive buffer 501, a second predictive buffer 503 and a third predictive buffer 505. The autonomous vocal-command recognition device 201 may also comprise a first confidence buffer 507, a second confidence buffer 509, and a third confidence buffer 511. More or less buffers may be used in various embodiments. This may depend on the number of syllables being analyzed for KWS by the first neural network 203.

The first predictive buffer 501 may comprise a circular buffer that receives the first output 203A from the first neural network 203. The first neural network 203 may operate continuously calculating new output for the first output 203A for each frame of audio date. This data may be stored in the first predictive buffer 501 until it is full. The size of any of buffers discussed with reference to FIG. 5 may differ from embodiment to embodiment. For example, the first predictive buffer 501 may be large enough to store four values from the first output 203A. Each value may correspond to an inference from a successive frame of audio data. In various embodiments, the first predictive buffer 501 may be larger or smaller. If full, the oldest value stored in the first predictive buffer 501 may be removed to store a new value output by the first neural network 203 when the new value is calculated. Data may, thus, continue to cycle through the buffer continuously as the first neural network 203 calculates new output values for new frames of audio data.

For example, an output from the first neural network 203 corresponding to a first frame of audio data may be stored in memory location 501D of the first predictive buffer 501, an output corresponding to a second frame may be stored in memory location 501C, output corresponding to a third frame may be stored in memory location 501B, and output corresponding to a fourth frame may be stored in memory location 501A. When the first neural network 203 produces output for a fifth audio frame, the output stored in the memory location 501D may be removed and the remaining outputs shifted to the left so the output for the fifth frame may be stored in 501A.

The second predictive buffer 503 may comprise a circular buffer that receives the second output 203B from the first neural network 203. As the first neural network 203 outputs data for the second output 203B, the data may be stored in the second predictive buffer 503 until it is full. If full, the oldest value stored in the second predictive buffer 503 may be removed to store a new value calculated by the first neural network 203. Data may, thus, continue to cycle through the buffer continuously as the first neural network 203 calculates new output values for new audio frames.

For example, an output from the first neural network 203 corresponding to a first frame of audio data may be stored in memory location 503D of the second predictive buffer 503, an output corresponding to a second frame may be stored in memory location 503C, output corresponding to a third frame may be stored in memory location 503B, and output corresponding to a fourth frame may be stored in memory location 503A. When the first neural network 203 produces output for a fifth audio frame, the output stored in the memory location 503D may be removed and the remaining outputs shifted to the left so the output for the fifth frame may be stored in 503A.

The third predictive buffer 505 may comprise a circular buffer that receives the third output 203c from the first neural network 203. As the first neural network 203 outputs data for the third output 203C, the data may be stored in the third predictive buffer 505 until it is full. If full, the oldest value stored in the third predictive buffer 505 may be removed to store a new value calculated by the first neural network 203. Data may, thus, continue to cycle through the buffer continuously as the first neural network 203 calculates new output values for new frames of audio data.

For example, an output from the first neural network 203 corresponding to a first frame of audio data may be stored in memory location 505D of the third predictive buffer 505, an output corresponding to a second frame may be stored in memory location 505C, output corresponding to a third frame may be stored in memory location 505B, and output corresponding to a fourth frame may be stored in memory location 505A. When the first neural network 203 produces output for a fifth audio frame, the output stored in the memory location 505D may be removed and the remaining outputs shifted to the left so the output for the fifth frame may be stored in 505A.

In various embodiments, the outputs stored in the first predictive buffer 501, the second predictive buffer and the third predictive buffer may be averaged and supplied to the first confidence buffer 507, second confidence buffer 509, and third confidence buffer 511 respectively.

In various embodiments, it may be advantageous to use less than all the memory locations to calculate an average value. For example, when detecting a two syllable word, like "Marvin," it may be beneficial to use the oldest outputs from the buffer that receives the output from the first neural network 203 that corresponds to the first syllable. For example, when performing KWS with a network trained to detect a keyword "Marvin" using a first output 203A corresponding to the syllable "Mar" and using a second output 203B corresponding to the syllable "vin" the average calculated from data in the first predictive buffer 501 may be based on older audio frames. For example, this may comprise memory location 501D and memory location 501C as indicated by bracket 502. And, the average calculated from data in the second predictive buffer 503 may based on newer audio frames. For example, this may comprise memory location 503B and memory location 503A, as indicated by bracket 504.

In various embodiments, an average may be calculated from all the data in the third predictive buffer 505. For example, where the third predictive buffer 505 is coupled with a third output 203C from the first neural network 203 that outputs a probability that an audio frame comprises filler, it may be desirable to calculate an average value for the third predictive buffer based on each of memory locations of the third predictive buffer 505. For example, data from memory location 505D, 505C, 505B, and 505A, as denoted by bracket 506, may be used to calculate an average for the third predictive buffer 505.

In various embodiments, the averages from the first predictive buffer 501, the second predictive buffer 503, and the third predictive buffer 505 may be supplied to the first confidence buffer 507, the second confidence buffer 509, and the third confidence buffer 511 respectively. The first confidence buffer 507, second confidence buffer 509 and the third confidence buffer 511 may comprise circular buffers that operate in a First In First Out manner like described with reference to the first predictive buffer 501, second predictive buffer 503, and the third predictive buffer 505.

In various embodiments, the first confidence buffer 507 may comprise a first memory location 507D, a second memory location 507C, a third memory location 507B, and a fourth memory location 507A. Each memory location may store an average value of the first section (501D and 501C) of the first predictive buffer 501. In various embodiments, the maximum value of the results stored in the confidence buffer 507 may be selected to be provided to output 513.

In various embodiments, the second confidence buffer 509 may comprise a first memory location 509D, a second memory location 509C, a third memory location 509B, and a fourth memory location 509A. Each memory location may store an average value of the second section (503B and 503A) of the second predictive buffer 503. In various embodiments, the maximum value of the results stored in the confidence buffer 509 may be selected to be provided at output 515.

In various embodiments, the third confidence buffer 511 may comprise a first memory location 511D, a second memory location 511C, a third memory location 511B, and a fourth memory location 511A. Each memory location may store an average value of the third predictive buffer 505. These values may in turn be averaged themselves as indicated by bracket 512, and the result output at output 517.

In various embodiments, the averaged probabilities from output 513, output 515 and output 517 may be utilized to determine a binary confidence score indicating whether the first neural network 203 has identified a keyword. If the output 513 exceeds a threshold indicating that a first syllable of a keyword has been detected, and the output 515 exceeds a threshold that indicates a second syllable of a keyword had been detected, and the output 517 falls below a threshold that indicates that audio data is not filler, the binary confidence score may be set to a value that indicates that the keyword has been detected. As will be appreciated the value may be different in various embodiments. For example, it may comprise a "1" in some embodiments. In other embodiments, it may comprise a "0." In various embodiments, results from the output 513, output 515 and output 517 may be used with reference to each other to determine whether the keyword is present. For example, if the results from output 513 and output 515 both reflect probabilities higher than the results from the output 517, then the confidence score may be set to a value that indicates that the keyword has been detected. It should also be appreciated that in various embodiments, a confidence score may be generated by other ways than described with reference to FIG. 5.

In various embodiments, the second neural network 205 may be triggered by the confidence score and a trigger value derived from MFCC coefficients.

Figure 6:
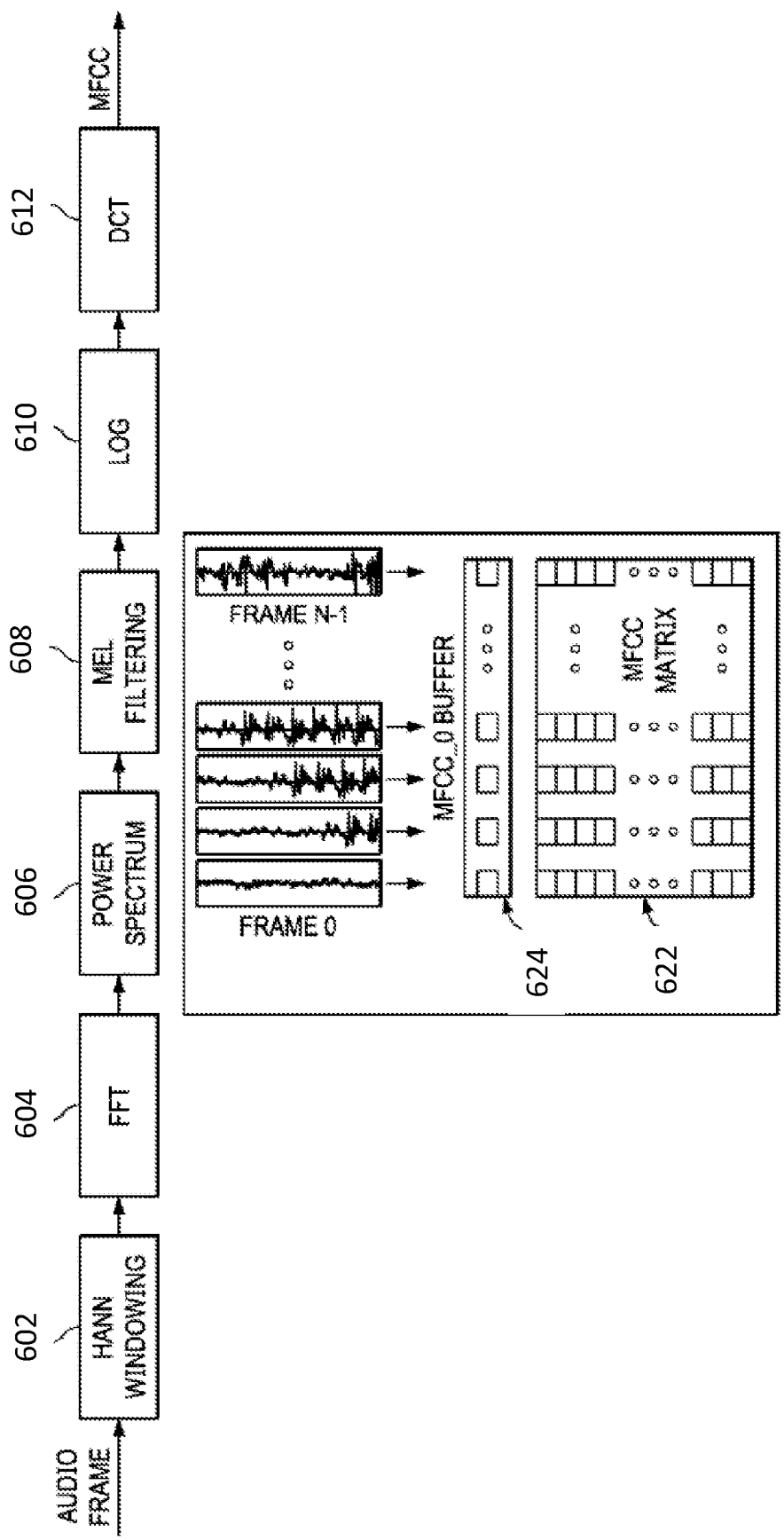
FIG. 6 shows more details of how the MFCC matrix may be used for triggering activation of a second neural network, according to a known approach.

FIG. 6 shows more details of how the MFCC matrix may be used for triggering activation of a second neural network, according to a known approach.

As described above, techniques for generating an MFCC matrix from audio frames are known. For instance, an audio frame may be processed through the Hann windowing operation 602, the fast Fourier transform (FFT) operation 604, the power spectrum operation 606, the Mel filtering operation 608, the log operation 610, and the discrete cosine transform (DCT) operation 612 to generate the corresponding column in the MFCC matrix.

The first row (row[0]) of the MFCC matrix 622 represents the power features of the corresponding frames 0, 1, 2, ..., (N−1). For the ease of explanation, the first row of the MFCC matrix 622 is named as the MFCC_0 buffer 624. So, the MFCC_0 buffer 624 may be a part of the MFCC matrix 622. In another embodiment, the MFCC_0 buffer 624 may be a separate buffer containing copies of the coefficients from the first row of the MFCC matrix 622. As the MFCC matrix 622 changes, the MFCC_0 buffer 624 changes accordingly. The MFCC_0 buffer 624 may provide information for determining the trigger condition ("on" v. "off").

The MFCC matrix 622 changes over time when new audio buffers come in. For example, at time T(i), the MFCC matrix 622 includes N columns, column[0], column [1], ..., and column[N−1]. At time T(i+1), a new audio buffer comes in. Consequently, the frames are left shifted. That is, frame 0 at T(i) is out at T(i+1). frame 1 at T(i) becomes frame 0 at T(i+1), frame 2 at T(i) becomes frame 1 at T(i+1), ..., and frame (N−1) at T(i) becomes frame (N−2) at T(i+1). The new audio buffer becomes a last frame (frame (N−1)) at T(i+1). Accordingly, the MFCC matrix 522 is updated by a left shift. That means, column[0] at T(i) is shifted out at T(i+1). Column[1] at T(i) becomes column[0] at T(i+1). Column[2] at T(i) becomes column[1] at T(i+1), ..., and column[N−1] at T(i) becomes column[N−2] at T(i+1). The last column, column[N−1] at T(i+1) includes coefficients representing audio features corresponding the new frame[N−1] at T(i+1).

Because the MFCC_0 buffer 624 is the first row of the MFCC matrix 622, the MFCC_0 buffer 624 is updated by a left shift accordingly when the MFCC matrix 622 is updated. The first element of the MFCC_0 buffer 624 (MFCC_0[0]) is shifted out at T(i_1). MFCC_0 [1] at T(i) becomes MFCC_0 [0] at T(i+1). MFCC_0 [2] at T(i) becomes MFCC_0 [1] at T(i+1), ..., and MFCC_0 [N−1] at T(i) becomes MFCC_0[N−2] at T(i+1). MFCC_0 [N−1] at T(i+1) holds the first coefficient of the new column[N−1] at T(i+1).

The MFCC_0 buffer may be utilized to determine whether audio data 209 exceeds an energy threshold. For examples, as disclosed in U.S. patent application Ser. No. 16/708,983 filed on Dec. 10, 2010, which is incorporated by reference in its entirety herein. This may allow the autonomous vocal-command recognition device 201 to prevent the second neural network 205 from being triggered when an energy level of the audio signal at a level that indicates it is background data. This also may be advantageous to design the autonomous vocal-command recognition device 201 to operate within a predetermined range of a user. For example, in various embodiments, the autonomous vocal-command recognition device 201 may be designed to be used within a short distance from a user or held to a user's mouth. The threshold energy level for a trigger may be selected to prevent speech from outside the desired range triggering the second neural network 205.

Working together on the autonomous vocal-command recognition device 201, the first neural network 203 and the second neural network 205 may form an internal neural network pipeline on the autonomous vocal-command recognition device 201.

Figure 7:
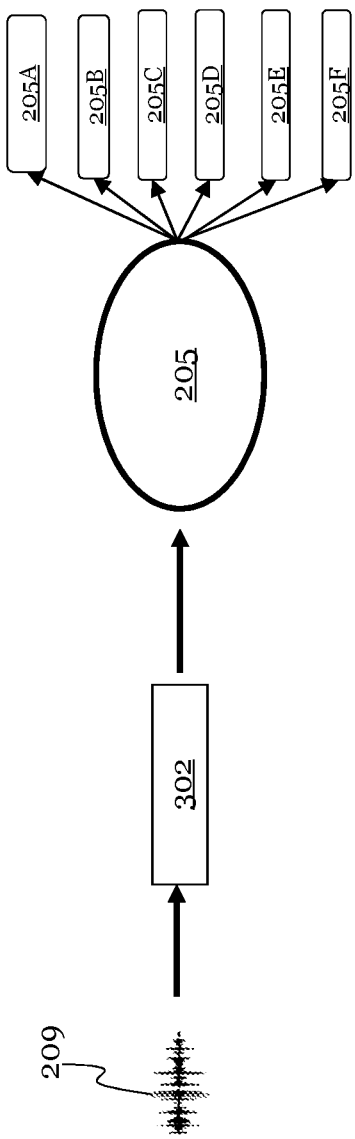
FIG. 7 depicts a block diagram representing output of the second neural network in accordance with an embodiment.

FIG. 7 depicts a block diagram representing output of the second neural network in accordance with an embodiment.

Once the second neural network 205 is activated, audio data 209 may be received by feature extraction module 302. The feature extraction module 302 may extract an MFCC matrix that is provided to the second neural network 205. In various embodiments, the feature extraction module 302 used in conjunction with the first neural network 203 may also be used for the second neural network 205.

When active, for each frame of audio data the second neural network 205 may produce outputs corresponding to probabilities that respective commands are found in the audio frame. In various embodiments, using a 80 MHz processor and 64 node, 6 layer LTSM neural network for a 32 ms frame of audio data it may take 45 ms for the second neural network 203 to produce an inference and 9 ms for a new MFCC column to be calculated by the feature extraction module 302. So it may take a total of 54 ms to generate an inference about for the vocal command in a frame of audio data.

As discussed above, the second neural network 205 may be trained to identify a number of vocal commands from the audio data 209 and output a probability that a vocal command was contained in the audio data 209 for each vocal command. In various embodiments, the second neural network may output six results. In various embodiments, the second neural network 205 may comprise a Recurrent Neural Network such as a Long short-term memory recurrent neural network. The second neural network 205 may comprise a 64 node-LTSM layer plus a 3 node Multi Layer Perceptron. It should be appreciated that other types of neural networks may be used in various embodiments, including but not limited to simple Recurrent Neural Networks, Convolutional Neural Network, Multilayer Perceptron networks. The configuration of the networks in terms of the number nodes, layers and other factors may differ in various embodiments. As will be appreciated, a confidence score may be calculated in a variety of ways known in the art. In various embodiments, the outputs of the second neural network may be compared with thresholds. In various embodiments, outputs from successive frames from the outputs may be stored in buffers to calculate rolling averages for the respective outputs. Comparisons between the rolling averages may be made to determine if a command word is present. For example, in various embodiments, it may be determined that a command is identified if the output corresponding to the command, or the rolling average corresponding to the command, has the highest probability among the possibilities (e.g. the probability for the command is higher than probability that it is filler and higher than the other commands identifiable by the second neural network 205). In various embodiments, the probability may also need to exceed a threshold. For example, a command may be identified if the output corresponding to the command, or rolling average corresponding to the command, has the highest probability and the probability exceeds a threshold, for example 0.6. The value of the threshold may vary from embodiment to embodiment. In various embodiments the confidence scores for each of the outputs of the second neural network may be calculated.

In one or more embodiments, five of the results may correspond to vocal commands and one result may correspond to a probability that the audio data comprised filler. The second neural network 205 may be trained to identify vocal commands using the same process used for training the first neural network to identify the keyword. However, this may be more complex because the second neural network 205 may need to be trained to output probabilities for more words than the first neural network 203. This also may increase the complexity of the second neural network 205. Both the first neural network 203 and the second neural network 205 may be trained using an augmented dataset as disclosed in U.S. patent application Ser. No. 17/000,892 titled "Method and System for Processing an Electric Signal Transduced From a Voice Signal" filed on Aug. 24, 2020, which is incorporated by reference in its entirety herein.

Figure 8:
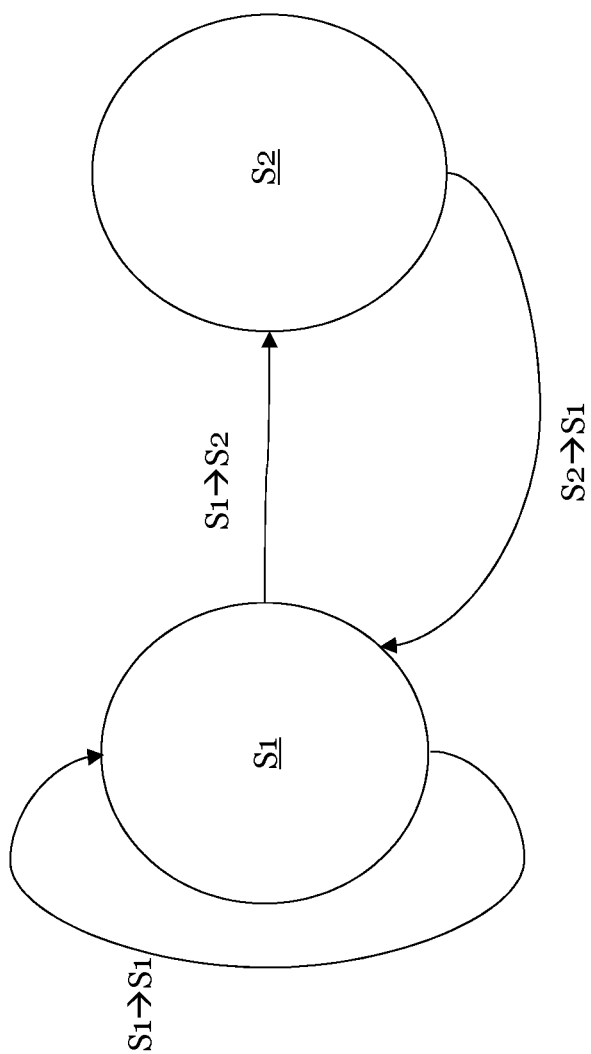
FIG. 8 illustrates a Finite State Machine depiction of a neural network pipeline of an autonomous vocal-command recognition device in accordance with an embodiment.

FIG. 8 illustrates a Finite State Machine depiction of a neural network pipeline of an autonomous vocal-command recognition device in accordance with an embodiment.

In a first state S1, the first neural network 203 may operates continuously to identify a keyword. Meanwhile, the second neural network 205 does not operate and, thus, does not consume any of the autonomous vocal-command recognition device 201 resources. In various embodiments, the autonomous vocal-command recognition device 201 will be triggered to transition to a second state S2 when the first neural network 203 identifies the keyword. In various embodiments, this may depend on a confidence score. Additional trigger conditions may also be required to prompt transition from the first state S1 to the second state S2, such as an MFCC_0 buffer condition. If the trigger condition, or trigger conditions, are not met the autonomous vocal-command recognition device 201 will remain in the first state S1.

If the trigger condition, or trigger conditions, are met the autonomous vocal-command recognition device 201 may transit to the second state which activates the second neural network 205. The second neural network 205 may be activated, in various embodiments, by calling a software function. The software function may receive the MFCC matrix as an input. The first neural network 203 may be deactivated while the second neural network 205 is operating. The second neural network 205 may then arrive at a determination as to whether a vocal command is present in audio data and disseminate that information where appropriate. After an inference from the second neural network 205, the autonomous vocal-command recognition device 201 may move back to the first state S1 and the second neural network 205 is deactivated. In various embodiments, the autonomous vocal-command recognition device 201 may move back to the first state S1 after a predetermined time has passed. In various embodiments, the time period may for the second state S2 may be reset if a command is identified. For example, if the period for the second state is 2 seconds, the period may restart each time a command other than filler is recognized. In various embodiments, the autonomous vocal-command recognition device 201 may move back to the first state after the second neural network has run for one cycle, which may comprise a single inference or a number of inferences desired to calculate a rolling output average. As will be appreciated, this may vary among different embodiments. MFCC coefficients may continuously be extracted from streaming audio data during the first state S1 and second state S2.

Figure 9:
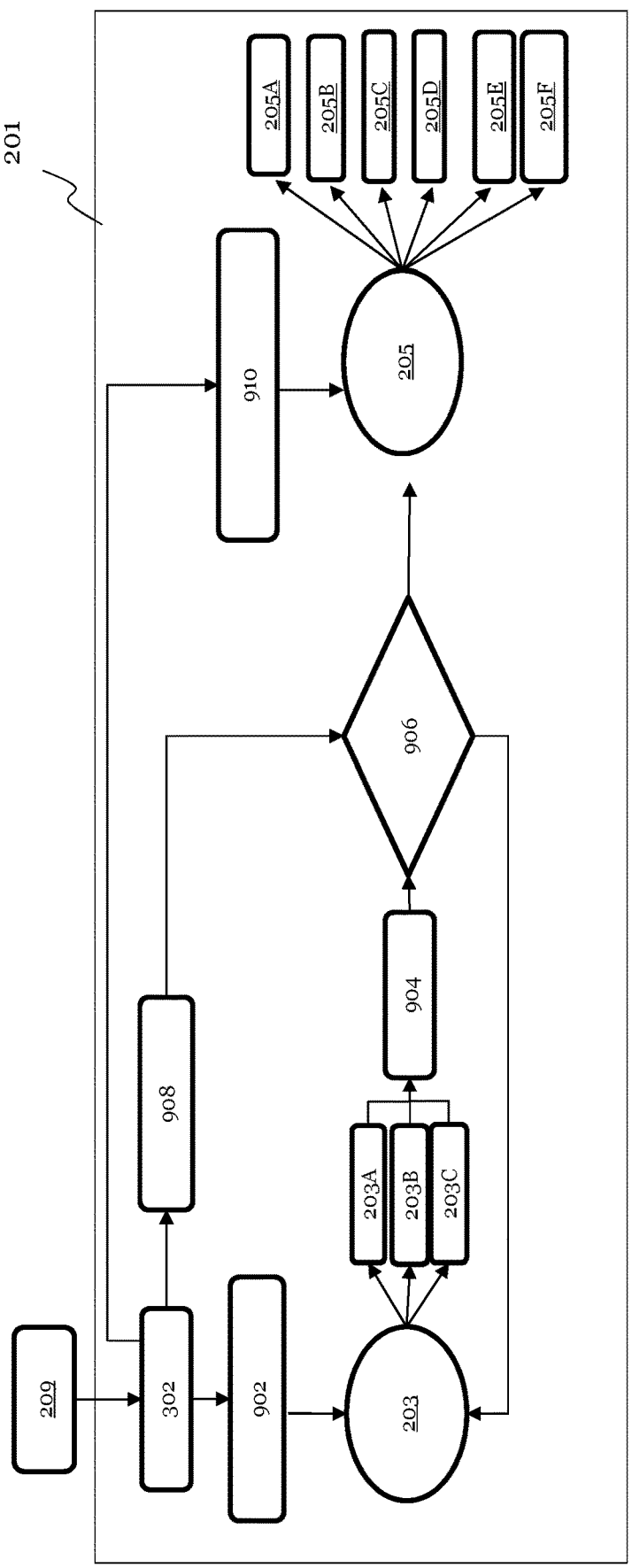
FIG. 9 depicts a block chart of the internal operation of a vocal-command recognition device in accordance with an embodiment.

FIG. 9 depicts a block chart of the internal operation of a vocal-command recognition device in accordance with an embodiment.

An autonomous vocal-command recognition device 201 may comprise a feature extraction module 302. The feature extraction unit may extract MFCC coefficients from audio data 209. The extracted MFCC coefficient matrix may be supplied the first neural network 203. In various embodiments, the MFCC coefficient matrix may need be normalized to account for ambient sound conditions, hardware offsets or like. Normalization may be performed using mean and standard deviation calculated during training of the neural networks. It may, thus, be advantageous to utilize different normalization parameters for the first neural network 203 and the second neural network 205. Normalization may also utilizing max and minimum values. A normalization module 902 may normalize the MFCC coefficient matrix and supply the normalized data to the first neural network 203. The first neural network 203 may analyze the data and output results to confidence score module 904. Output from the confidence score module 904 may be supplied to a trigger module 906 that decides whether to activate the second neural network 205. In various embodiments, the trigger module 906 may also receive additional inputs to determine whether to activate the second neural network 205. For example, the trigger module 906 may also receive input from an MFCC_0 filter 908 that evaluates the first row of MFCC coefficient matrix to evaluate the energy level of the audio signal.

When the second neural network 205 is activated, the MFCC coefficient matrix may also be suppled from the feature extraction module 302 to the second neural network 205. A second normalization module 910 may normalized the MFCC coefficient matrix before it is received by the second neural network 205. In various embodiments, the normalization module 902 may supply the normalized data to the second neural network 205. The second neural network 205 may then analyze the next frame or the next desired frames of the audio data 209 to identify vocal commands.

Figure 10:
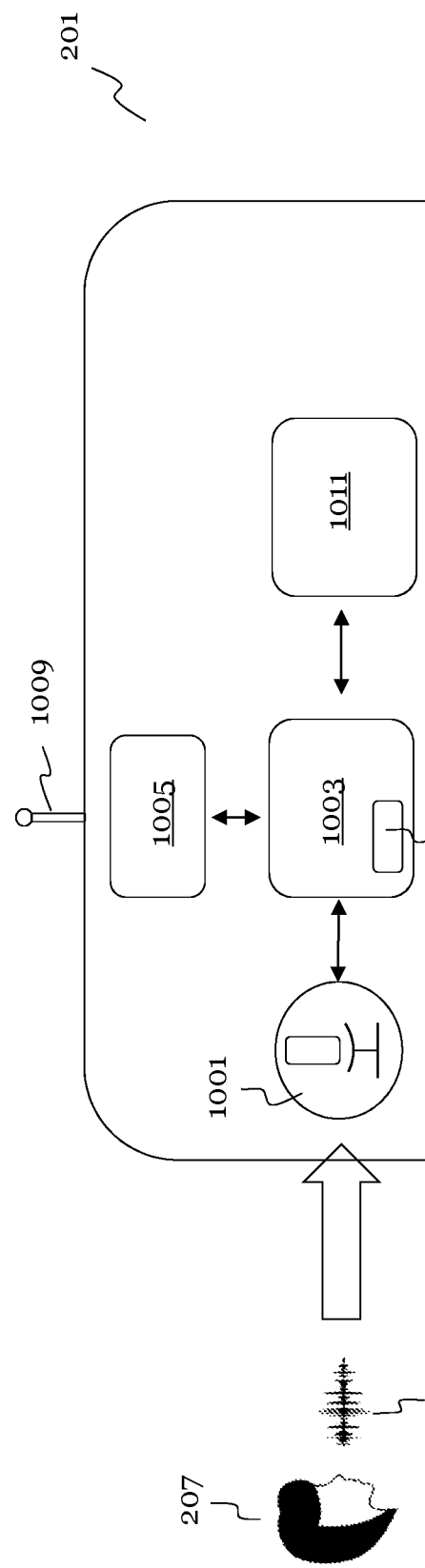
FIG. 10 depicts an embodiment of the autonomous vocal-command recognition device of an embodiment.

FIG. 10 depicts an embodiment of the autonomous vocal-command recognition device of an embodiment.

The autonomous vocal-command recognition device 201 may comprise audio-detecting circuitry 1001. The audio-detecting circuitry 12 may comprise a microphone configured to transduce the sound into an electric signal that communicates the audio data. In various embodiments, the audio-detecting circuitry 1001 may comprise a single microphone. In various embodiments, the audio-detecting circuitry 1001 may comprise more than one microphone. The audio-detecting circuitry 1001 may be configured to sample audio signals at 16 kHz in one or more embodiments. However, other sampling rates may be utilized. The electric signals may be provided a processing circuitry 1003. The processing circuitry 1003 may comprise a microcontroller, SoC, FPGA, DSP, ASIC or other device. In various embodiments, the processing circuity may comprise an 80 MHz microcontroller. The processing circuitry 1003 may comprise a memory circuit block 1007. The autonomous vocal-command recognition device 201 may further comprise a communication circuit 1005. The communication circuit 1005 may comprise a microcontroller, SoC, FPGA, DSP, ASIC or other device for enabling wireless communication on the autonomous vocal-command recognition device 201. The communication circuit may also comprise a balun. The autonomous vocal-command recognition device 201 may also comprise a transmitter 1009 for transmitting wireless signals. In various embodiments, the transmitter may be used to transmit commands identified by the second neural network 205, or instructions based on the commands identified, to other devices to implement the command. For example, a "go" command may be transmitted to a remotely controlled device that moves in response to command. The autonomous vocal-command recognition device 201 may also comprise sensing circuitry 1011 that is in communication with the processing circuitry 1003. Sensing circuitry 1011 may include accelerometers, gyroscopes, magnetometers, barometers or other circuity. Sensing circuitry 1011 may be utilized to translate commands recognized by the second neural network 205 into instructions.

In various embodiments, the first neural network 203 and second neural network 205 may comprise a computer program product loadable in the memory of the processing circuitry 1003. In various embodiments, any or all of the A feature extraction module 302, the normalization module 902, confidence score module 904, trigger module 906, confidence score module 904, and second normalization module 910 may comprise a computer program product loadable in the memory of the processing circuitry 1003.

Figure 11:
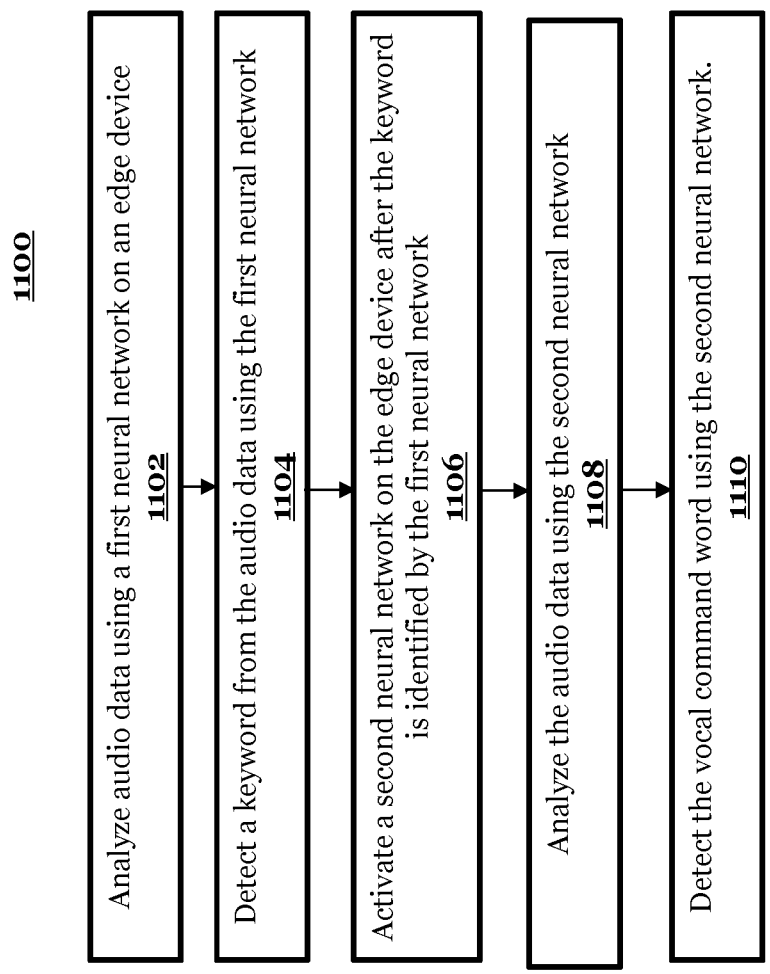
FIG. 11 depicts a method to detect a vocal command in accordance with an embodiment.

FIG. 11 depicts a method 1100 to detect a vocal command in accordance with an embodiment.

The method 1100 may include at a step 1102, analyzing audio data using a first neural network on an edge device; at a step 1104, detecting a keyword from the audio data using the first neural network; at a step 1106 activating a second neural network on the edge device after the keyword is identified by the first neural network; at a step 1108, analyzing the audio data using the second neural network; and at a step 1110 detecting the vocal command word using the second neural network.

The method of claim 1100 may further include running the first neural network on a microcontroller and running the second neural network on the microcontroller.

The method of claim 1100 may further include, wherein the first neural network is trained to only detect the keyword.

The method of claim 1100 may further include wherein the second neural network is trained to detect a set of vocal commands.

The method of claim 1100 may further include wherein the set of vocal commands comprises five words.

The method of claim 1100 may further include extracting 13 Mel Frequency Cepstral Coefficients for each frame of the audio data.

The method of claim 1100 may further include wherein detecting the keyword comprises identifying a first syllable of the keyword in the audio data, identifying a second syllable of the keyword in the audio data.

The method of claim 1100 may further include determining that a trigger condition has been met before the second neural network.

The method of claim 1100 may further include wherein the trigger condition comprises determining that the audio data exceeds an energy threshold.

EXAMPLE 1

A method to detect a vocal command word, the method comprising: analyzing audio data using a first neural network on an edge device; detecting a keyword from the audio data using the first neural network, the first neural network having a first processing workload; activating a second neural network on the edge device after the keyword is identified by the first neural network, the second neural network having a second processing workload that is greater than the first processing workload; analyzing the audio data using the second neural network; and detecting the vocal command word using the second neural network.

EXAMPLE 2

The method of Example 1 further comprising running the first neural network on a microcontroller and running the second neural network on the microcontroller.

EXAMPLE 3

The method of Example 1 to Example 2, wherein the first neural network is trained to only detect the keyword.

EXAMPLE 4

The method of Example 1 to Example 3, wherein the second neural network is trained to detect a set of vocal commands.

EXAMPLE 5

The method of Example 1 to Example 4, wherein the set of vocal commands comprises five words.

EXAMPLE 6

The method of Example 1 to Example 5, further comprising extracting 13 Mel Frequency Cepstral Coefficients for each frame of the audio data.

EXAMPLE 7

The method of Example 1 to Example 6, wherein detecting the keyword comprises identifying a first syllable of the keyword in the audio data, identifying a second syllable of the keyword in the audio data.

EXAMPLE 8

The method of Example 1 to Example 7, further comprising determining that a trigger condition has been met before activating the second neural network.

EXAMPLE 9

The method of Example 1 to Example 8, wherein the trigger condition comprises determining that the audio data exceeds an energy threshold.

EXAMPLE 10

An electronic device comprising processing circuitry configured to: analyze audio data using a first neural network run on the processing circuitry, the first neural network having a first processing workload; detect a keyword from the audio data using the first neural network; activate a second neural network on the processing circuitry after the keyword is identified by the first neural network, the second neural network having a second processing workload that is greater than the first processing workload; analyze the audio data using the second neural network; and detect a vocal command word using the second neural network.

EXAMPLE 11

The electronic device of Example 10, further comprising a transducer to convert the audio data into an electrical signal that is delivered to the processing circuitry.

EXAMPLE 12

The device of Example 10 or Example 11, further comprising a communication circuit and a transmitter to wirelessly transmit instructions based on the vocal command word to a remote device.

EXAMPLE 13

The device of Example 10 to Example 12, wherein the first neural network is trained to only detect the keyword.

EXAMPLE 14

The device of Example 10 or Example 13, wherein the second neural network is trained to detect a set of vocal commands.

EXAMPLE 15

The device of Example 10 or Example 14, wherein the set of vocal commands comprises five words.

EXAMPLE 16

The device of Example 10 or Example 15, wherein the processor is configured to detect a trigger condition, which must be met before the second neural network is activated.

EXAMPLE 17

A non-transitory computer-readable storage medium storing a computer program for execution by a processing circuit, the computer program comprising software code portion to cause the processing circuit to implement a method including analyzing audio data using a first neural network on an edge device, the first neural network having a first processing workload; detecting a keyword from the audio data using the first neural network; activating a second neural network on the edge device after the keyword is identified by the first neural network, the second neural network having a second processing workload that is greater than the first processing workload; analyzing the audio data using the second neural network; and detecting a vocal command word using the second neural network.

EXAMPLE 18

The non-transitory computer-readable storage medium of Example 17, wherein the first neural network is trained to only detect the keyword.

EXAMPLE 19

The non-transitory computer-readable storage medium of Example 17 or Example 18, wherein the second neural network is trained to detect a set of vocal commands.

EXAMPLE 20

The non-transitory computer-readable storage medium of Example 17, Example 18 or Example 19, wherein the set of vocal commands comprises five words.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims

What is claimed is:

1. A method to detect a vocal command word, the method comprising:
    segmenting audio data into a plurality of audio frames, each audio frame having an overlapping portion with an immediate succeeding audio frame;
    analyzing the audio frames using a first neural network on an edge device, the analyzing comprising searching a first part of an audio frame for a first syllable of a keyword in the audio data, searching a second part of the audio frame for a second syllable of the keyword in the audio data, and searching a third part of the audio frame for a filler sound in the audio data;
    detecting the keyword from the audio data using the first neural network, the first neural network having a first processing workload, wherein detecting the keyword comprises identifying the first syllable, the second syllable, and the filler sound based on the analyzing;
    activating a second neural network on the edge device after the keyword is identified by the first neural network, the second neural network having a second processing workload that is greater than the first processing workload, wherein the first neural network and the second neural network form a neural network pipeline as a finite state machine with a first state and a second state, the first neural network activated during the first state, the second neural network deactivated during the first state, the first neural network deactivated during the second state, and the second neural network activated during the second state;
    analyzing the audio data using the second neural network; and
    detecting the vocal command word using the second neural network, the second neural network detecting the vocal command word without involvement of a cloud device.

2. The method of claim 1 further comprising running the first neural network on a microcontroller and running the second neural network on the microcontroller.

3. The method of claim 1, wherein the second neural network is trained to detect a set of vocal commands.

4. The method of claim 3, wherein the set of vocal commands comprises five words.

5. The method of claim 1, further comprising extracting 13 Mel Frequency Cepstral Coefficients for each frame of the audio data.

6. The method of claim 1, further comprising determining that a trigger condition has been met before activating the second neural network.

7. The method of claim 6, wherein the trigger condition comprises determining that the audio data exceeds an energy threshold.

8. The method of claim 1, wherein the first neural network and the second neural network form an internal neural network pipeline on an autonomous vocal-command recognition device.

9. An electronic device comprising:
    a neural network pipeline having the form of a finite state machine, the finite state machine having a first state and a second state,
    wherein a first neural network of the neural network pipeline operates continuously to identify a keyword in an audio data in the first state, a second neural network of the neural network pipeline being inactive during the first state, the first neural network configured to, in the first state:
        analyze the audio data, the first neural network having a first processing workload, and
        detect the keyword from the audio data, and
    wherein the finite state machine is configured to transition from the first state to the second state in response to the first neural network identifying the keyword, wherein the first neural network is deactivated during the second state, the second neural network configured to, in the second state:
        analyze the audio data using the second neural network, the second neural network having a second processing workload that is greater than the first processing workload, and
        detect a vocal command word using the second neural network.

10. The electronic device of claim 9, further comprising a transducer to convert the audio data into an electrical signal that is delivered to the neural network pipeline.

11. The electronic device of claim 9, further comprising a communication circuit and a transmitter to wirelessly transmit instructions based on the vocal command word to a remote device.

12. The electronic device of claim 9, wherein the second neural network is trained to detect a set of vocal commands.

13. The electronic device of claim 12, wherein the set of vocal commands comprises five words.

14. The electronic device of claim 9, wherein a trigger condition is detected in response to the first neural network identifying the keyword, the trigger condition activating the second neural network.

15. The electronic device of claim 9, wherein the finite state machine is configured to transition from the second state to the first state in response to detecting the vocal command word, after passing of a predetermined time, or after the second neural network has ran for one cycle.

16. A non-transitory computer-readable storage medium storing a computer program for execution by a processing circuit, the computer program comprising software code portion to cause the processing circuit to implement a method comprising:
    segmenting audio data into a plurality of audio frames, each audio frame having an overlapping portion with an immediate succeeding audio frame;
    analyzing the audio frames using a first neural network on an edge device, the first neural network having a first processing workload, the analyzing comprising searching a first part of an audio frame for a first syllable of a keyword in the audio data, searching a second part of the audio frame for a second syllable of the keyword in the audio data, and searching a third part of the audio frame for a filler sound in the audio data;
    detecting the keyword from the audio data using the first neural network, wherein detecting the keyword comprises identifying the first syllable, the second syllable, and the filler sound based on the analyzing;
    activating a second neural network on the edge device after the keyword is identified by the first neural network, the second neural network having a second processing workload that is greater than the first processing workload, wherein the first neural network and the second neural network form a neural network pipeline as a finite state machine with a first state and a second state, the first neural network activated during the first state, the second neural network deactivated during the first state, the first neural network deactivated during the second state, and the second neural network activated during the second state;

analyzing the audio data using the second neural network; and detecting a vocal command word using the second neural network, the second neural network detecting the vocal command word without involvement of a cloud device.

17. The non-transitory computer-readable storage medium of claim 16, wherein the first neural network is trained to only detect the keyword.

18. The non-transitory computer-readable storage medium of claim 16, wherein the second neural network is trained to detect a set of vocal commands.

19. The non-transitory computer-readable storage medium of claim 18, wherein the set of vocal commands comprises five words.

20. The non-transitory computer-readable storage medium of claim 16, wherein the first neural network and the second neural network form an internal neural network pipeline on an autonomous vocal-command recognition device.

* * * * *